(12) United States Patent
Ishihara et al.

(10) Patent No.: US 9,147,868 B2
(45) Date of Patent: Sep. 29, 2015

(54) MICROPOROUS FILMS, METHODS FOR THEIR PRODUCTION, AND APPLICATIONS THEREOF

(75) Inventors: Takeshi Ishihara, Saitama-ken (JP); Kohtaro Kimishima, Kanagawa (JP)

(73) Assignee: Toray Battery Separator Film Co., Ltd. (JP)

( * ) Notice: Subject to any disclaimer, the term of this patent is extended or adjusted under 35 U.S.C. 154(b) by 960 days.

(21) Appl. No.: 12/741,166

(22) PCT Filed: Nov. 17, 2008

(86) PCT No.: PCT/JP2008/071181
§ 371 (c)(1),
(2), (4) Date: Sep. 23, 2010

(87) PCT Pub. No.: WO2009/069533
PCT Pub. Date: Apr. 6, 2009

(65) Prior Publication Data
US 2011/0003178 A1    Jan. 6, 2011

Related U.S. Application Data

(60) Provisional application No. 60/991,384, filed on Nov. 30, 2007, provisional application No. 61/052,438, filed on May 12, 2008.

(51) Int. Cl.
*H01M 2/14* (2006.01)
*H01M 2/16* (2006.01)
*B01D 69/12* (2006.01)
*B29C 55/00* (2006.01)
*B32B 5/32* (2006.01)
(Continued)

(52) U.S. Cl.
CPC ........... *H01M 2/1686* (2013.01); *B01D 69/125* (2013.01); *B29C 55/005* (2013.01); *B32B 5/32* (2013.01); *B32B 27/32* (2013.01); *H01M 2/1653* (2013.01); *B01D 71/26* (2013.01); *B29K 2105/04* (2013.01); *B32B 2250/24* (2013.01); *B32B 2457/10* (2013.01); *H01M 10/052* (2013.01); *Y02T 10/7011* (2013.01)

(58) Field of Classification Search
CPC .................................................. H01M 2/14
USPC .................................................. 429/7
See application file for complete search history.

(56) References Cited

U.S. PATENT DOCUMENTS

2004/0091778 A1* 5/2004 Ozaki et al. ................. 429/231.1
2005/0098913 A1* 5/2005 Funaoka et al. ................. 264/41
(Continued)

FOREIGN PATENT DOCUMENTS

EP    1 905 586    4/2008
GB    2 006 513    5/1979
(Continued)

*Primary Examiner* — Ula A Ruddock
*Assistant Examiner* — Jacob Marks
(74) *Attorney, Agent, or Firm* — DLA Piper LLP (US)

(57) ABSTRACT

The invention relates to a microporous membrane having a relatively low heat shrinkage values along planar axes of the membrane. The invention also relates to a battery separator formed by such microporous membrane, and a battery comprising such a separator. Another aspect of the invention relates to a method for making the multi-layer, microporous polyolefin membrane, a method for making a battery using such a membrane as a separator, and a method for using such a battery.

15 Claims, 5 Drawing Sheets

(51) Int. Cl.
*B32B 27/32* (2006.01)
*B01D 71/26* (2006.01)
*B29K 105/04* (2006.01)
*H01M 10/052* (2010.01)

(56) References Cited

U.S. PATENT DOCUMENTS

| | | |
|---|---|---|
| 2007/0207376 A1* | 9/2007 | Call et al. .................. 429/129 |
| 2007/0218271 A1 | 9/2007 | Lee et al. |
| 2007/0269719 A1* | 11/2007 | Sadamitsu et al. ............ 429/249 |
| 2008/0118827 A1* | 5/2008 | Call et al. .................. 429/129 |

FOREIGN PATENT DOCUMENTS

| | | |
|---|---|---|
| JP | 2000/198866 | 7/2000 |
| JP | 2001/172420 | 6/2001 |
| JP | 2001/192467 | 7/2001 |
| WO | WO 2007/010878 | 1/2007 |
| WO | WO 2007/049568 | 5/2007 |
| WO | WO 2007/117042 | 10/2007 |
| WO | WO 2007/132942 | 11/2007 |
| WO | WO 2007/132943 | 11/2007 |
| WO | WO 2008/026780 | 3/2008 |
| WO | WO 2008/026782 | 3/2008 |

* cited by examiner

US 9,147,868 B2

MICROPOROUS FILMS, METHODS FOR THEIR PRODUCTION, AND APPLICATIONS THEREOF

CROSS REFERENCE TO RELATED APPLICATIONS

This application is a 371 National Stage Application of International Application No. PCT/JP2008/071181, filed Nov. 17, 2008, which claims the benefit of EP 08159803.9, filed Jul. 7, 2008, U.S. Provisional Application Ser. No. 61/052,438, filed May 12, 2008, and U.S. Provisional Application Ser. No. 60/991,384, filed Nov. 30, 2008, the disclosures of which are herein incorporated by reference in their entireties.

FIELD OF THE INVENTION

The invention relates to a microporous membrane having a relatively low heat shrinkage values along planar axes of the membrane. The invention also relates to a battery separator formed by such microporous membrane, and a battery comprising such a separator. Another aspect of the invention relates to a method for making the multi-layer, microporous polyolefin membrane, a method for making a battery using such a membrane as a separator, and a method for using such a battery.

BACKGROUND OF THE INVENTION

Microporous membranes can be used as battery separators in, e.g., primary and secondary lithium batteries, lithium polymer batteries, nickel-hydrogen batteries, nickel-cadmium batteries, nickel-zinc batteries, silver-zinc secondary batteries, etc. When microporous polyolefin membranes are used for battery separators, particularly lithium ion battery separators, the membranes' characteristics significantly affect the properties, productivity and performance of the batteries. Accordingly, it is desirable for the microporous membrane to have resistance to thermal shrinkage, particularly at elevated temperature. Resistance to heat shrinkage can improve the battery's protection against internal short circuiting that might otherwise occur as the separator shrinks away from the edges of the battery's electrodes at elevated temperature.

European Patent Application Publication No. EP 1 905 586, published Feb. 2, 2008, discloses multi-layer polymeric membranes useful as battery separator film. Among the membranes exemplified are those having (i) a rupture temperature of 180° C., a machine direction heat shrinkage of 3% at 105° C., and a transverse direction heat shrinkage of 4% at 105° C.; and (ii) a rupture temperature of 175° C., a machine direction heat shrinkage of 2% at 105° C., and a transverse direction heat shrinkage of 2% at 105° C. membranes.

Japanese patent document JP2000198866 (published Jul. 18, 2000) discloses multi-layer battery separator films having heat shrinkage values of 10%. The membrane comprises layers containing alpha-olefin-CO copolymers and an inorganic species (cross-linked silicone powders).

PCT publication WO2007-049568 (published May 3, 2007) also discloses multi-layer battery separator films having a machine direction heat-shrinkage value of 4% and a transverse direction heat shrinkage value of 3%. The films of this reference comprise a core layer containing heat-resistant polymers or an inorganic filler.

U.S. Patent Publication 2007/0218271 discloses monolayer microporous films having machine and transverse direction heat shrinkage values of 4% or less. The films of this reference are produced from high density polyethylene having a weight-average molecular weight of $2 \times 10^5$ to $4 \times 10^5$, containing not more than 5 wt. % of molecules with a molecular weight of $1 \times 10^4$ or less and not more than 5 wt. % of molecules having a molecular weight of $1 \times 10^6$ or more.

Japanese Patent Application Laid Open No. JP2001-192467 discloses monolayer microporous membranes having transverse direction heat shrinkage values as low as 1.8%, but at a relatively low permeability (Gurley value of 684 seconds). Similarly, Japanese Patent Application Laid Open No. and JP2001-172420 discloses monolayer microporous membranes having transverse direction heat shrinkage values as low as 1.1%, but at a Gurley value above 800.

While improvements have been made, there is still a need for battery separator film having increased resistance to heat shrinkage.

SUMMARY OF THE INVENTION

In an embodiment, the invention relates to a multi-layer microporous membrane having a heat shrinkage ratio measured at 105° C. in at least one planar direction of the membrane of less than 3% and a rupture temperature of 180° C. or higher. In a related embodiment, the planar direction is a transverse direction of the membrane, and the transverse direction heat shrinkage ratio is 1.0% or less, or 0.7% or less.

In another embodiment, the invention relates to a method for producing a microporous membrane, comprising, (1) combining at least a first polyolefin and at least one first diluent to form a first mixture,
(2) combining at least a second polyolefin and at least a second diluent to form a second mixture; the second polyolefin comprising polypropylene having a weight-average molecular weight of $6 \times 10^5$ or more and a $\Delta Hm$ of 90 J/g or more;
(3) extruding at least a portion of the first mixture and extruding at least a portion of the second mixture to form a multi-layer extrudate having first and third layers containing the first mixture and a second layer located between the first and third layers, the second layer containing the second mixture, wherein the amount of polypropylene in the extrudate is at least 2.0 wt. % based on the total weight of polyolefin in the extrudate;
(4) cooling the multi-layer extrudate to form a multi-layer, cooled extrudate;
(5) removing at least a portion of the first and second diluents from the cooled extrudate to produce the membrane.

The microporous membrane is useful as a battery separator in lithium ion batteries. Such batteries can be used as power sources for electric vehicles and hybrid electric vehicles.

DETAILED DESCRIPTION OF THE INVENTION

Figure 1:
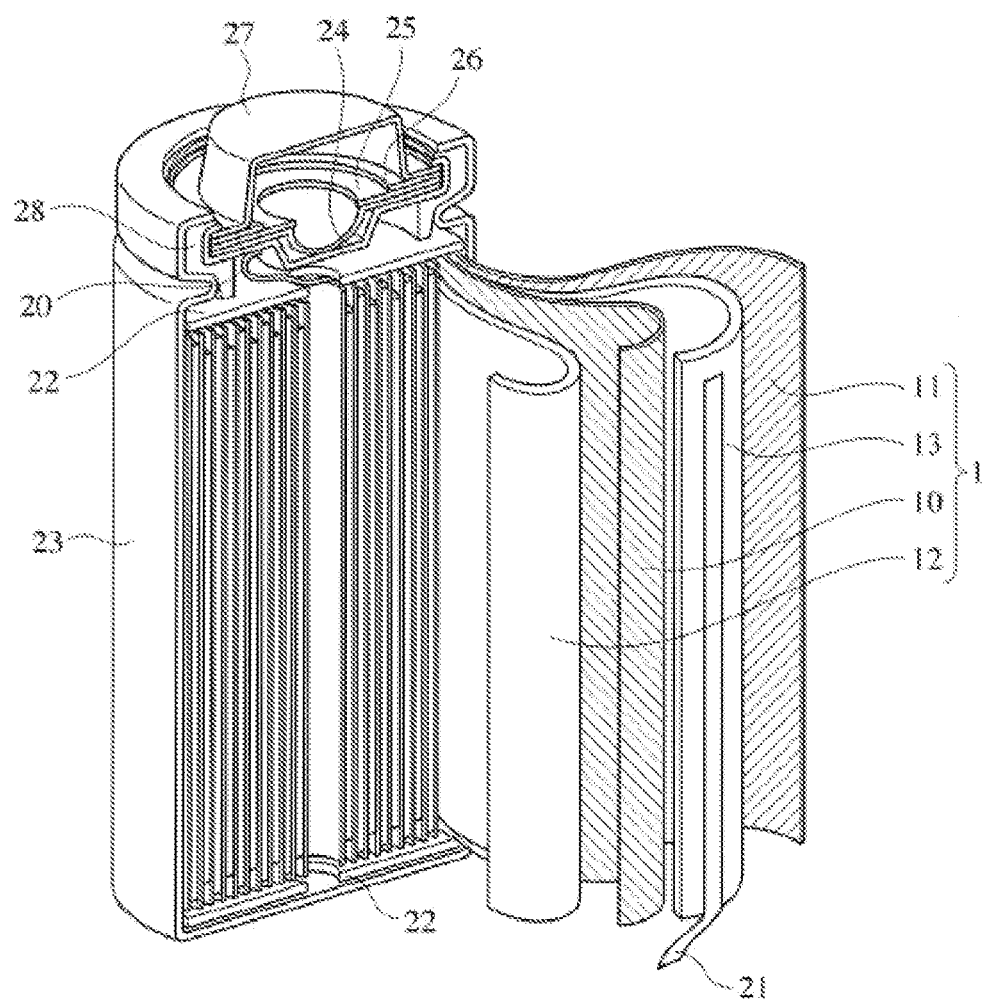
FIG. 1 is a cross-sectioned, perspective view showing one example of cylindrical type lithium ion secondary battery comprising an electrode assembly of the present invention.

In an embodiment, the invention relates to a microporous film having improved resistance to heat shrinkage at elevated temperature. In another embodiment, the invention relates to a microporous membrane having a good balance of important properties including resistance to heat shrinkage at elevated temperature, while maintaining sufficient Normalized Pin Puncture Strength and Normalized Air Permeability (as hereinafter defined).

One battery failure mode involves the high temperature softening of membranes used as battery separator film, resulting in a loss of dimensional stability especially near the edges of the membrane. Should the width of the membrane decrease at a temperature above the membrane's shut down-temperature (generally much higher than 105° C.), the close spacing between anode, cathode, and separator can lead to an internal short circuit in the battery. This is particularly the case in prismatic and cylindrical batteries, where even a small change in membrane width can result in anode-cathode contact at or near the battery's edges.

The invention relates to the discovery of microporous membranes having improved heat shrinkage properties, i.e., better dimensional stability at elevated temperature. The improvement in heat shrinkage properties is observed not only at relatively low temperatures (e.g., below about 110° C., which is within the operating temperature range of conventional lithium ion batteries), but also at relatively high temperatures (e.g., above 125° C., or above 135° C., e.g., above the shut down temperature of conventional battery separator film for lithium ion batteries).

Since the battery separator film might not be softened sufficiently at 105° C. to exhibit poor heat shrinkage, the film's heat shrinkage performance at 105° C. is not always a reliable is not always a reliable indicator of the potential for internal battery short circuiting. In contrast, the film's maximum TD heat shrinkage in the molten state is measured at a temperature that is above the membrane's shut down temperature, and thus can be a better indicator for this type of internal short circuiting. TD heat shrinkage in the molten state is generally not predictable from the membrane's heat shrinkage performance at 105° C.

[1] Composition and Structure of the Microporous Membrane

In an embodiment, the multi-layer, microporous membrane comprises three layers, wherein the outer layers (also called the "surface" or "skin" layers) comprise the first microporous layer material and at least one intermediate layer (or "core" layer) comprises the second microporous layer material. In a related embodiment, the multi-layer, microporous membrane can comprise additional layers, i.e., in addition to the two skin layers and the core layer. In a related embodiment where the multi-layer, microporous membrane comprises three or more layers, the outer layers consist essentially of (or consists of) the first microporous layer material and at least one intermediate layer consists essentially of (or consists of) the second microporous layer material. While it is not required, the core layer can be in planar contact with one or more of the skin layers in a stacked arrangement such as A/B/A with face-to-face stacking of the layers. The membrane can be referred to as a "polyolefin membrane" when the membrane contains polyolefin. While the membrane can contain polyolefin only, this is not required, and it is within the scope of the invention for the polyolefin membrane to contain polyolefin and materials that are not polyolefin.

When the multi-layer, microporous membrane has three or more layers, the multi-layer, microporous polyolefin membrane has at least one layer comprising the first microporous layer material and at least one layer comprising the second microporous layer material.

In an embodiment, the microporous membrane is a three layer membrane wherein the thickness of the core layer is in the range of about 4.6% to about 50%, or from about 5% to about 30%, or from 5% to about 15% of the total thickness of the multi-layer microporous membrane.

In an embodiment, the first microporous layer material comprises a first polyethylene and optionally a first polypropylene. The second microporous layer material comprises a second polypropylene and optionally a second polyethylene. The total amount of polyethylene in the multi-layer, microporous polyolefin membrane is in the range of from about 70 wt. % to about 98 wt. %, or from about 90 wt. % to about 97.95 wt. %, or from about 95 wt. % to about 97.9 wt. %, based on the weight of the multi-layer, microporous membrane. The total amount of polypropylene in the multi-layer, microporous membrane is generally greater than 2.0 wt. % based on the total weight of the membrane. When the membrane contains material in addition to polyolefin, the wt. % is based on the weight of the membrane's total polyolefin content. For example, the total amount of polypropylene in the multi-layer, microporous membrane can be in the range of from about 2.0 wt. % to about 30 wt. %, or from about 2.05 wt. % to about 10 wt. %, or from about 2.1 wt. % to about 5 wt. %, based on the weight of the multi-layer, microporous membrane. In an embodiment, the first polyethylene is present in the first microporous layer material in a first polyethylene amount in the range of from about 80 wt. % to about 100 wt. % based on the weight of the first microporous layer material; the first polypropylene is present in the first microporous layer material in a first polypropylene amount in the range of from about 0 wt. % to about 20 wt. % based on the weight of the first microporous layer material; the second polyethylene is present in the second microporous layer material in a second polyethylene amount in the range of from about 0 wt. % to about 99 wt. %, or from about 40 wt. % to about 90 wt. %, or from about 50 wt. % to about 80 wt. % based on the weight of the second microporous layer material; and the second polypropylene is present in the second microporous layer material in a second polypropylene amount in the range of from about 1 wt. % to about 100 wt. %, or from about 10 wt.

% to about 60 wt. %, or from about 20 wt. % to about 50 wt. % based on the weight of the second microporous layer material.

The first and second polyethylene and the first and second polypropylene will now be described in more detail.

A. The First Polyethylene

In an embodiment, the first polyethylene is a polyethylene having an weight averaged molecular weight ("Mw") in the range of about $1 \times 10^4$ to about $1 \times 10^7$, or about $1 \times 10^5$ to about $5 \times 10^6$, or about $2 \times 10^5$ to about $3 \times 10^6$. Although it is not critical, the first polyethylene can have terminal unsaturation of, e.g., two or more per 10,000 carbon atoms in the polyethylene. Terminal unsaturation can be measured by, e.g., conventional infrared spectroscopic methods. The first polyethylene can be one or more varieties of polyethylene, e.g., PE1, PE2, etc. In one embodiment, the first polyethylene comprises PE1. PE1 comprises polyethylene having an Mw ranging from about $1 \times 10^4$ to about $1 \times 10^6$. Optionally, the PE1 can be one or more of an high density polyethylene ("HDPE"), a medium-density polyethylene, a branched low-density polyethylene, or a linear low-density polyethylene. Although it is not critical, the Mw of high-density polyethylene can be in the range. e.g., of from about $1 \times 10^5$ to about $1 \times 10^6$, or from about $2 \times 10^5$ to about $9 \times 10^5$, or from about $4 \times 10^5$ to about $8 \times 10^5$. In an embodiment, PE1 is at least one of (i) an ethylene homopolymer or (ii) a copolymer of ethylene and a comonomer such as propylene, butene-1, hexene-1, etc, typically in a relatively small amount compared to the amount of ethylene, e.g., ≤10 mol. % based on 100% by mol of the copolymer. Such a copolymer can be produced using a single-site catalyst.

In an embodiment, the first polyethylene comprises PE2. PE2 comprises polyethylene having an Mw of at least about $1 \times 10^6$. For example, PE2 can be an ultra-high molecular weight polyethylene ("UHMWPE"). In an embodiment, PE2 is at least one of (i) an ethylene homopolymer or (ii) a copolymer of ethylene and a comonomer which is typically present in a relatively small amount compared to the amount of ethylene, e.g., ≤10 mol. % based on 100% by mol of the copolymer. The comonomer can be, for example, one or more of propylene, butene-1, pentene-1, hexene-1,4-methylpentene-1, octene-1, vinyl acetate, methyl methacrylate, or styrene. Although it is not critical, the Mw of PE2 can be in the range. e.g., of from about $1 \times 10^6$ to about $15 \times 10^6$, or from about $1 \times 10^6$ to about $5 \times 10^6$, or from about $1.2 \times 10^6$ to about $3 \times 10^6$.

In an embodiment, the first polyethylene comprises both PE1 and PE2. In this case, the amount of PE2 in the first polyethylene can be, e.g., in the range of about 0 wt. % to about 50 wt. %, such as about 1 wt. % to about 50 wt. %, based on the weight of the first polyethylene.

In one embodiment, the first polyethylene has one or more of the following independently-selected features:

(1) The first polyethylene comprises PE1.
(2) The first polyethylene consists essentially of, or consists of, PE1.
(3) The PE1 is one or more of a high-density polyethylene, a medium-density polyethylene, a branched low-density polyethylene, or a linear low-density polyethylene.
(4) PE1 is one or more of a high-density polyethylene having an Mw ranging from about $1 \times 10^5$ to about $1 \times 10^6$, e.g., from about $1 \times 10^5$ to about $9 \times 10^5$, such as from about $4 \times 10^5$ to about $8 \times 10^5$.
(5) PE1 is at least one of (i) an ethylene homopolymer or (ii) a copolymer of ethylene and 10 mol. % or less of a comonomer selected from the group of propylene, butene-1, hexene-1.
(6) The first polyethylene comprises both PE1 and PE2.
(7) PE2 has an Mw ranging from about $1 \times 10^6$ to about $15 \times 10^6$, e.g., from about $1 \times 10^6$ to about $5 \times 10^6$, such as from about $1.2 \times 10^6$ to about $3 \times 10^6$.
(8) PE2 is ultra-high-molecular-weight polyethylene.
(9) PE2 is at least one of (i) an ethylene homopolymer or (ii) a copolymer of ethylene and a 10 mol. % or less of a comonomer selected from the group of propylene, butene-1, hexene-1.
(10) The PE1 has a molecular weight distribution "MWD", defined as Mw/Mn, ≤100, e.g, in the range of about 3 to about 20, and PE2 has an MWD≤100, e.g., in the range of from about 4.5 to about 10.

B. The Second Polyethylene

The second polyethylene can be selected from among the same polyethylenes as the first polyethylene. For example, the second polyethylene can comprise PE1, PE2, or both PE1 and PE2. When the second polyethylene comprises PE1 and PE2, the amount of PE2 in the second polyethylene can be in the range of 0 wt. % to about 50 wt. %, or about 1 wt. % to about 50 wt. %, based on the weight of the second polyethylene. Optionally, the second polyethylene is substantially the same as the first polyethylene.

Mw and MWD of the polyethylenes (e.g., the first and second polyethylenes) are determined using a High Temperature Size Exclusion Chromatograph, or "SEC", (GPC PL 220, Polymer Laboratories), equipped with a differential refractive index detector (DRI). Three PLgel Mixed-B columns available from (available from Polymer Laboratories) are used. The nominal flow rate is 0.5 cm$^3$/min, and the nominal injection volume is 300 µL. Transfer lines, columns, and the DRI detector were contained in an oven maintained at 145° C. The measurement is made in accordance with the procedure disclosed in "*Macromolecules*, Vol. 34, No. 19, pp. 6812-6820 (2001)".

The GPC solvent used is filtered Aldrich reagent grade 1,2,4-Trichlorobenzene (TCB) containing approximately 1000 ppm of butylated hydroxy toluene (BHT). The TCB was degassed with an online degasser prior to introduction into the SEC. Polymer solutions were prepared by placing dry polymer in a glass container, adding the desired amount of the above TCB solvent, then heating the mixture at 160° C. with continuous agitation for about 2 hours. The concentration of UHMWPE solution was 0.25 to 0.75 mg/ml. Sample solution will be filtered off-line before injecting to GPC with 2 µm filter using a model SP260 Sample Prep Station (available from Polymer Laboratories).

The separation efficiency of the column set is calibrated with a calibration curve generated using a seventeen individual polystyrene standards ranging in Mp ("Mp" being defined as the peak in Mw) from about 580 to about 10,000,000. The polystyrene standards are obtained from Polymer Laboratories (Amherst, Mass.). A calibration curve (log Mp vs. retention volume) is generated by recording the retention volume at the peak in the DRI signal for each PS standard and fitting this data set to a 2nd-order polynomial. Samples are analyzed using IGOR Pro, available from Wave Metrics, Inc.

C. The First Polypropylene

Besides polyethylene, the second and optionally the first layer materials can comprise polypropylene. The polypropylene can be, for example, one or more of (i) a propylene homopolymer or (ii) a copolymer of propylene and a comonomer. The copolymer can be a random or block copolymer. The comonomer can be, e.g., one or more of α-olefins such as ethylene, butene-1, pentene-1, hexene-1,4-methylpentene-1, octene-1, vinyl acetate, methyl methacrylate, and styrene, etc.; and diolefins such as butadiene, 1,5-hexadiene, 1,7-octadiene, 1,9-decadiene, etc. The amount of the comonomer in the copolymer is in a range that does not adversely affect properties of the multi-layer microporous membrane such as heat resistance, compression resistance, heat shrinkage resistance, etc., e.g., less than 10% by mol based on 100% by mol of the entire copolymer. Optionally, the polypropylene has one or more of the following properties: (i) the polypropylene has an Mw ranging from about $1 \times 10^4$ to about $4 \times 10^6$, or about $3 \times 10^5$ to about $3 \times 10^6$; (ii) the polypropylene has an Mw/Mn≤100, e.g., in the range of from about 1 to about 50, such as about 2 to about 20; (iii) the polypropylene's tacticity is isotactic; (iv) the polypropylene has heat of fusion "ΔHm" (measured by a differential scanning calorimeter (DSC) according to JIS K7122) of at least about 90 Joules/gram; (v) polypropylene has a melting peak (second melt) of at least about 160° C., (vi) the polypropylene has a Trouton's ratio of at least about 15 when measured at a temperature of about 230° C. and a strain rate of 25 sec$^{-1}$; and/or (vii) the polypropylene has an elongational viscosity of at least about 50,000 Pa sec at a temperature of 230° C. and a strain rate of 25 sec$^{-1}$. Optionally, the first polypropylene is substantially the same as the second polypropylene.

D. The Second Polypropylene

In an embodiment, the second polypropylene has one or more of the following characteristics. The second polypropylene preferably has a weight-average molecular weight of $6 \times 10^5$ or more, and a ΔHm of 90 J/g or more, and an Mw/Mn≤100, e.g., in the range of about 1 to 50, such as about 2 to about 6. The weight-average molecular weight of the second polypropylene can be, e.g., $8 \times 10^5$ or more, e.g., in the range $8 \times 10^5$ to $2.0 \times 10^6$, such as about $1.1 \times 10^6$ to about $1.5 \times 10^6$. In an embodiment, the ΔHm of the polypropylene is 95 J/g or more, e.g., 100 J/g or more, such as 110 J/g or more, or 115 J/g or more. The polypropylene optionally has a crystallinity ≥50%, e.g., in the range of 65% to 75%.

The polypropylene content of the second layer material can be, e.g., in the range of from about 1 wt. % to about 100 wt. %, but optionally about 20 wt. % to about 80 wt. %, e.g., in the range of 20 wt. % to 50 wt. %, based on the weight of the second layer material.

As long as the above conditions of the Mw and the ΔHm are met, the type of the polypropylene is not particularly critical, but may be a propylene homopolymer, a copolymer of propylene and the other α-olefin, or a mixture thereof, the homopolymer being preferable. The copolymer may be a random or block copolymer. The comonomer may include, for example, ethylene, butene-1, pentene-1, hexene-1,4-methylpentene-1, octene, vinyl acetate, methyl methacrylate, styrene, and combinations thereof. The amount of comonomer is ≤10 mol. %, based on 100 mol. % of the copolymer. Optionally, the second polypropylene has one or more of the following properties: (i) the polypropylene has an Mw in the range of from about $1 \times 10^4$ to about $4 \times 10^6$, or about $6 \times 10^5$ to about $3 \times 10^6$; (ii) the polypropylene has an Mw/Mn in the range of from about 1.01 to about 100, or about 2 to about 6; (iii) the polypropylene's tacticity is isotactic; (iv) the polypropylene has a ΔHm of at least about 95 Joules/gram; (v) the polypropylene has a melting peak (second melt) of at least about 160° C., (vi) the polypropylene has a Trouton's ratio of at least about 15 when measured at a temperature of about 230° C. and a strain rate of 25 sec$^{-1}$; and/or (vii) the polypropylene has an elongational viscosity of at least about 50,000 Pa sec at a temperature of 230° C. and a strain rate of 25 sec$^{-1}$.

The Mw, Mn, and ΔHm of polypropylene are determined by the method disclosed in PCT patent application No. WO/2007/132942, which is incorporated by reference herein in its entirety.

While the microporous membrane can contain copolymers, inorganic species (such as species containing silicon and/or aluminum atoms), and/or heat-resistant polymers such as those described in PCT Publication WO 2008/016174, these are not required. In an embodiment, the multilayer membrane is substantially free of such materials. Substantially free in this context means the amount of such materials in the microporous membrane is less than 1 wt. %, or less than 0.1 wt. %, or less than 0.01 wt. %, based on the total weight of the microporous membrane.

[2] Materials Used to Produce the Multi-Layer, Microporous Polyolefin Membrane

A. Polymer Resins Used to Make the First Microporous Layer Material

In an embodiment, the first microporous layer material is made from a mixture of a first polyolefin (e.g. a first polyolefin composition) and a first diluent. For example, in an embodiment, the first microporous layer material is produced from a first polyolefin solution which comprises a first polyolefin composition and a first process solvent (also called a "membrane-forming solvent" or "diluent"). Since the process produces a multi-layer microporous membrane, the process solvent is also referred to as a diluent or a membrane-forming solvent. The resins used to make the first polyolefin will now be described in more detail.

(1) The First Polyethylene Resin

In an embodiment, the first polyethylene resin comprises the first polyethylene, where the first polyethylene is as described above in section [1]. For example, the first polyethylene resin can be PE1, PE2, and combinations thereof.

(2) The First Polypropylene Resin

Besides the first polyethylene resin, the first polyolefin composition can optionally further comprise a first polypropylene resin. In an embodiment, the first polypropylene resin comprises the first polypropylene, where the first polypropylene is as described above in section [1].

(3) Formulation

The amount of diluent (e.g., process solvent) in the first polyolefin solution can be in the range. e.g., of from about 25 wt. % to about 99 wt. % based on the weight of the first polyolefin solution. In an embodiment, the amount of the first polyethylene resin in the first polyolefin composition can be in the range. e.g., of from about 50 wt. % to about 100 wt. % based on the weight of the first polyolefin composition. The balance of the first polyolefin composition can be the first polypropylene.

B. Polymer Resins Used to Produce the Second Microporous Layer Material

In an embodiment, the second microporous layer material is made from a mixture of a second polyolefin (e.g., a second polyolefin composition, and a second diluent). For example, in one embodiment, the second microporous layer material is produced from a second polyolefin solution which comprises a second polyolefin composition and a second process solvent (which can also be called a "membrane-forming solvent" or "diluent"). In an embodiment, the second polyolefin composition comprises a second polyethylene resin and a second polypropylene resin. The second polyethylene resin comprises the second polyethylene as described above in section [1]. The second polypropylene resin comprises the second polypropylene as described above in section [1].

The amount of process solvent in the second polyolefin solution can be in the range. e.g., of from about 25 wt. % to about 99 wt. % based on the weight of the second polyolefin solution. In an embodiment, the amount of the second polyethylene resin in the second polyolefin composition can be in the range. e.g., of from about 5 wt. % to about 95 wt. % based on the weight of the second polyolefin composition. The balance of the second polyolefin composition can be the second polypropylene.

Although the membrane is described as being produced from polyolefin solutions, the invention is not limited thereto. Any extrudable combination of polymer and diluent can be used.

C. Third Polyolefin

Although it is not required, each of the first and second polyolefin compositions can further comprise a third polyolefin selected from the group consisting of polybutene-1, polypentene-1, poly-4-methylpentene-1, polyhexene-1, polyoctene-1, polyvinyl acetate, polymethyl methacrylate, polystyrene and an ethylene •α-olefin copolymer (except for an ethylene-propylene copolymer). In an embodiment where a third polyolefin is used, the third polyolefin can, for example, have an Mw in the range of about $1\times10^4$ to about $4\times10^6$. In addition to or besides the third polyolefin, the first and/or second polyolefin composition can further comprise a polyethylene wax, e.g., one having an Mw in the range of about $1\times10^3$ to about $1\times10^4$. When used, these species should be present in amounts less than an amount that would cause deterioration in the desired properties (e.g., meltdown, shutdown, etc.) of the multi-layer, microporous membrane. When the third polyolefin is one or more of polybutene-1, polypentene-1, poly-4-methylpentene-1, polyhexene-1, polyoctene-1, polyvinyl acetate, polymethyl methacrylate, and polystyrene, the third polyolefin need not be a homopolymer, but may be a copolymer containing other α-olefins.

The multi-layer microporous membrane generally comprises the polyolefin used to form the polyolefin solution. A small amount of washing solvent and/or process solvent can also be present, generally in amounts less than 1 wt. % based on the weight of the microporous polyolefin membrane. A small amount of polyolefin molecular weight degradation might occur during processing, but this is acceptable. In an embodiment, molecular weight degradation during processing, if any, causes the value of Mw/Mn of the polyolefin in the membrane to differ from the Mw/Mn of the first or second polyolefin solution by no more than about 50%, or no more than about 1%, or no more than about 0.1%.

[3] Production Method of Multi-Layer, Microporous Polyolefin Membrane

In an embodiment, the microporous polyolefin membrane is a two-layer membrane. In another embodiment, the microporous polyolefin membrane has at least three layers. The production of the microporous polyolefin membrane will be mainly described in terms of two-layer and three-layer membranes, although those skilled in the art will recognize that the same techniques can be applied to the production of membranes or membranes having at least four layers.

In an embodiment, the three-layer microporous polyolefin membrane comprises first and third microporous layers constituting the outer layers of the microporous polyolefin membrane and a second layer situated between (and optionally in planar contact with) the first and third layers. In an embodiment, the first and third layers are produced from the first polyolefin solution and the second (or inner) layer is produced from the second polyolefin solution. In another embodiment, the first and third layers are produced from the second polyolefin solution and the second layer is produced from the first polyolefin solution.

A. First Production Method

The first method for producing a multi-layer membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding (preferably simultaneously) the first and second polyolefin solutions through at least one die to form an extrudate, (4) cooling the extrudate to form a cooled extrudate, e.g., a multi-layer, gel-like sheet, (5) removing at least a portion of the membrane-forming solvent from the multi-layer, sheet to form a solvent-removed sheet, and (6) drying the solvent-removed gel-like sheet to remove volatile species, if any, in order to form the multi-layer, microporous polyolefin membrane. An optional stretching step (7), and an optional hot solvent treatment step (8), etc. can be conducted between steps (4) and (5), if desired. After step (6), an optional step (9) of stretching a multi-layer, microporous membrane, an optional heat treatment step (10), an optional cross-linking step with ionizing radiation (11), and an optional hydrophilic treatment step (12), etc., can be conducted if desired. The order of the optional steps is not critical.

(1) Preparation of First Polyolefin Solution

The first polyolefin composition comprises polyolefin resins as described above that can be combined, e.g., by dry mixing or melt blending with an appropriate membrane-forming solvent to produce the first polyolefin solution. The first polyolefin solution can contain additives such as one or more antioxidant. In an embodiment, the amount of such additives does not exceed 1 wt. % based on the weight of the polyolefin solution.

The first process solvent (i.e., the first membrane-forming solvent or first diluent) is preferably a solvent that is liquid at room temperature. While not wishing to be bound by any theory or model, it is believed that the use of a liquid solvent to form the first polyolefin solution makes it possible to conduct stretching of the extrudate (generally a gel-like sheet) at a relatively high stretching magnification.

The choice of first diluent, mixing condition, extrusion condition, etc. can be the same as those disclosed in PCT Publication No. WO 2008/016174, for example.

The amount of the first polyolefin composition in the first polyolefin solution is not critical. In an embodiment, the amount of first polyolefin composition in the first polyolefin solution can range from about 1 wt. % to about 75 wt. %, based on the weight of the polyolefin solution, for example from about 20 wt. % to about 70 wt. %. The amount of the first polyethylene is e.g., 1 wt. % to 50 wt. %, such as 20 wt. % to 40 wt. % based on the weight of the first polyolefin solution.

(2) Preparation of Second Polyolefin Solution

The second polyolefin solution can be prepared by the same methods used to prepare the first polyolefin solution. For example, the second polyolefin solution can be prepared by melt-blending a second polyolefin composition with a second diluent. The second diluent can be selected from among the same diluents as the first diluent. And while the second diluent can be (and generally is) selected independently of the first diluent, the diluent can be the same as the first diluent, and can be used in the same relative concentration as the first diluent is used in the first polyolefin solution.

The second polyolefin composition is generally selected independently of the first polyolefin composition. The second polyolefin composition comprises the second polyethylene resin and the second polypropylene resin.

In an embodiment, the method for preparing the second polyolefin solution differs from the method for preparing the first polyolefin solution, only in that the mixing temperature is preferably in a range from the melting point (Tm2) of the second polypropylene to Tm2+90° C.

(3) Extrusion

In an embodiment, the first polyolefin solution is conducted from a first extruder to a first die and the second polyolefin solution is conducted from a second extruder to a second die. A layered extrudate in sheet form (i.e., a body significantly larger in the planar directions than in the thickness direction) can be extruded from the first and second die. Optionally, the first and second polyolefin solutions are co-extruded from the first and second die with a planar surface of a first extrudate layer formed from the first polyolefin solution in contact with a planar surface of a second extrudate layer formed from the second polyolefin solution. A planar surface of the extrudate can be defined by a first vector in the machine direction of the extrudate and a second vector in the transverse direction of the extrudate.

The choice of die or dies and extrusion conditions can be the same as those disclosed in PCT Publication No. WO 2008/016174, for example.

While the extrusion can be used to make membranes having three-layers, the extrusion step is not limited thereto. For example, a plurality of dies and/or die assemblies can be used to produce multi-layer extrudates having four or more layers using the extrusion methods of the preceding embodiments. In such a layered extrudate, each surface or intermediate layer can be produced using either the first polyolefin solution and/or the second polyolefin solution.

In an embodiment, the amount of polypropylene in the extrudate is 2 wt. % based on the total weight of polyolefin in the extrudate. For example, the amount of polypropylene in the extrudate can be in the range of about 2 wt. % to about 30 wt. %, e.g., from about 2.05 wt. % to about 10 wt. %, such as from about 2.1 wt. % to about 5 wt. %.

(4) Formation of a Cooled Extrudate, e.g., a Multi-Layer, Gel-Like Sheet

The multi-layer extrudate can be formed into a multi-layer, gel-like sheet by cooling, for example. Cooling rate and cooling temperature are not particularly critical. For example, the multi-layer, gel-like sheet can be cooled at a cooling rate of at least about 50° C./minute until the temperature of the multi-layer, gel-like sheet (the cooling temperature) is approximately equal to the multi-layer, gel-like sheet's gelation temperature (or lower). Process conditions for cooling can be the same as those disclosed in PCT Publication No. WO 2008/016174, for example.

(5) Removal of the First and Second Diluents

In an embodiment, at least a portion of the first and second diluents (e.g., membrane-forming solvents) are removed (or displaced) from the multi-layer gel-like sheet in order to form a solvent-removed gel-like sheet. A displacing (or "washing") solvent can be used to remove (wash away, or displace) the first and second membrane-forming solvents. Process conditions for removing first and second diluents can be the same as those disclosed in PCT Publication No. WO 2008/016174, for example.

(6) Drying of the Solvent-Removed Gel-Like Sheet

In an embodiment, at least a portion of any remaining volatile species are removed from the membrane. For example, the membrane can be dried by removing at least a portion of the washing solvent. Any method capable of removing the washing solvent can be used, including conventional methods such as heat-drying, wind-drying (moving air), etc. Process conditions for removing volatile species such as washing solvent can be the same as those disclosed in PCT Publication No. WO 2008/016174, for example.

(7) Stretching

Prior to the step for removing the membrane-forming solvents (namely prior to step 5), the multi-layer, gel-like sheet can be stretched in order to obtain a stretched, multi-layer, gel-like sheet. It is believed that the presence of the first and second membrane-forming solvents in the multi-layer, gel-like sheet results in a relatively uniform stretching magnification. Heating the multi-layer, gel-like sheet, especially at the start of stretching or in a relatively early stage of stretching (e.g., before 50% of the stretching has been completed) is also believed to aid the uniformity of stretching.

Neither the choice of stretching method nor the degree of stretching magnification are particularly critical. Stretching conditions can be the same as those disclosed in PCT Publication No. WO 2008/016174, for example.

(8) Hot Solvent Treatment Step

Although it is not required, the multi-layer, gel-like sheet can be treated with a hot solvent between steps (4) and (5). Process conditions for such a treatment can be the same as those disclosed in PCT Publication No. WO 2008/016174, for example.

(9) Stretching of Multi-Layer, Microporous Membrane ("Dry Stretching")

In an embodiment, the dried multi-layer, microporous membrane of step (6) can be stretched, at least monoaxially. The stretching method selected is not critical, and conventional stretching methods can be used such as by a tenter method, etc. While it is not critical, the membrane can be heated during stretching. While the choice is not critical, the stretching can be monoaxial or biaxial. When biaxial stretching is used, the stretching can be conducted simultaneously in both axial directions, or, alternatively, the multi-layer, microporous polyolefin membrane can be stretched sequentially, e.g., first in the machine direction and then in the transverse direction. In an embodiment, simultaneous biaxial stretching is used. When the multi-layer gel-like sheet has been stretched as described in step (7) the stretching of the dry multi-layer, microporous polyolefin membrane in step (9) can be called dry-stretching, re-stretching, or dry-orientation.

The temperature to which the dry multi-layer, microporous membrane is exposed during stretching (the "dry stretching temperature") is not critical. In an embodiment, the dry stretching temperature is approximately equal to the melting point Tm or lower, for example in the range of from about the crystal dispersion temperature Tcd to the about the melting point Tm. When the dry stretching temperature is higher than Tm, it can be more difficult to produce a multi-layer, microporous polyolefin membrane having a relatively high compression resistance with relatively uniform air permeability characteristics, particularly in the transverse direction when the dry multi-layer, microporous polyolefin membrane is stretched transversely. When the stretching temperature is lower than Tcd, it can be more difficult to sufficiently soften the first and second polyolefins, which can lead to tearing during stretching, and a lack of uniform stretching. In an embodiment, the dry stretching temperature ranges from about 90° C. to about 135° C., or from about 95° C. to about 130° C.

When dry-stretching is used, the stretching magnification is not critical. For example, the stretching magnification of the multi-layer, microporous membrane can range from about 1.1 fold to about 1.8 fold in at least one planar (e.g., lateral) direction. Thus, in the case of monoaxial stretching, the stretching magnification can range from about 1.1 fold to about 1.8 fold in the longitudinal direction (i.e., the "machine direction") or the transverse direction, depending on whether the membrane is stretched longitudinally or transversely. Monoaxial stretching can also be accomplished along a planar axis between the longitudinal and transverse directions. It is believed that dry-stretching to a magnification larger than 1.8 fold results in a degradation in the membrane's heat shrinkage ratio in MD/TD, or both MD and TD. "MD" is the machine direction, i.e., the direction of membrane extrusion and processing. "TD" is the transverse direction of the membrane, and is approximately perpendicular to MD and the membrane's thickness.

In an embodiment, biaxial stretching is used (i.e., stretching along two planar axis) with a stretching magnification of about 1.1 fold to about 1.8 fold along both stretching axes, e.g., along both the longitudinal and transverse directions. The stretching magnification in the longitudinal direction need not be the same as the stretching magnification in the transverse direction. In other words, in biaxial stretching, the stretching magnifications can be selected independently. In an embodiment, the dry-stretching magnification is the same in both stretching directions.

In an embodiment, dry stretching involves stretching the membrane to an intermediate size as described above (generally to a magnification that is 1.1 fold to about 1.8 fold larger than the membrane's size in the stretching direction at the start of dry-stretching) and then relaxing (e.g., shrinking) the membrane in the direction of stretching to achieve a final membrane size in the stretching direction that is smaller than the intermediate size but larger than the size of the membrane in the stretching direction at the start of dry stretching. Generally, during relaxation the film is exposed to the same temperature as is the case during the dry-stretching to the intermediate size. In another embodiment, the membrane is stretched to an intermediate size that is larger than 1.8 fold the size of the membrane at the start of dry-stretching, as long as the final size of the membrane (e.g., the width measured along TD when the stretching is along TD) in either or both planar directions (MD and/or TD) is in the range of 1.1 to 1.8 fold the size of the film at the start of the dry-stretching step. In an embodiment, the membrane is stretched to an initial magnification of about 1.4 to 1.7 fold in MD and/or TD to an intermediate size, and then relaxed to a final size at a magnification of about 1.2 to 1.4 fold, the magnifications being based on the size of the film in the direction of stretching at the start of the dry-stretching step. In another embodiment, the membrane is dry-stretched in TD at an initial magnification to provide a membrane having an intermediate size in TD (an intermediate width) and then relaxed to a final size in TD that is in the range of about 1% to about 30%, or from about 5% to about 20%, of the intermediate size in TD. This relaxation can be accomplished, for examples, by moving the tenter clips gripping the edges of the membrane toward the center line of the machine direction.

The stretching rate is preferably 3%/second or more in a stretching direction. In the case of monoaxial stretching, stretching rate is 3%/second or more in a longitudinal or transverse direction. In the case of biaxial stretching, stretching rate is 3%/second or more in both longitudinal and transverse directions. It is observed that a stretching rate of less than 3%/second decreases the membrane's permeability, and provides the membrane with large variation in measured properties across the membrane along TD (particularly air permeability). The stretching rate is preferably 5%/second or more, more preferably 10%/second or more. Though not particularly critical, the upper limit of the stretching rate is can be 50%/second or more provided the membrane is not ruptured during stretching.

Additional Steps

Further optional steps such as (10) Heat treatment, (11) Cross-linking, and (12) Hydrophilizing Treatment can be conducted, if desired, under the conditions disclosed in PCT Publication No. WO 2008/016174, for example.

B. Second Production Method

The second method for producing the multi-layer, microporous polyolefin membrane comprises the steps of (1) combining (e.g., by melt-blending) a first polyolefin composition and a first membrane-forming solvent to prepare a first polyolefin solution, (2) combining a second polyolefin composition and a second membrane-forming solvent to prepare a second polyolefin solution, (3) extruding the first polyolefin solution through a first die and the second solution through a second die and then laminating the extruded first and second polyolefin solutions to form a multi-layer extrudate, (4) cooling the multi-layer extrudate to form a multi-layer, gel-like sheet, (5) removing at least a portion of the membrane-forming solvent from the multi-layer, gel-like sheet to form a solvent-removed gel-like sheet, and (6) drying the solvent-removed gel-like sheet in order to form the multi-layer, microporous membrane. An optional stretching step (7), and an optional hot solvent treatment step (8), etc., can be conducted between steps (4) and (5), if desired. After step (6), an optional step (9) of stretching a multi-layer, microporous membrane, an optional heat treatment step (10), an optional cross-linking step with ionizing radiations (11), and an optional hydrophilic treatment step (12), etc., can be conducted.

The process steps and conditions of the second production method are generally the same as those of the analogous steps described in connection with the first production method, except for step (3). Process conditions for step three can be the same as the conditions disclosed in PCT Publication No. WO 2008/016174, for example.

C. Third Production Method

The third method for producing the multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding the first polyolefin solution through at least one first die to form at least one first extrudate, (4) extruding the second polyolefin solution through at least one second die to form at least one second extrudate, (5) cooling first and second extrudates to form at least one first gel-like sheet and at least one second gel-like sheet, (6) laminating the first and second gel-like sheet to form a multi-layer, gel-like sheet, (7) removing at least a portion of the membrane-forming solvent from the resultant multi-layer, gel-like sheet to form a solvent-removed gel-like sheet, and (8) drying the solvent-removed gel-like sheet in order to form the multi-layer, microporous membrane. An optional stretching step (9), and an optional hot solvent treatment step (10), etc., can be conducted between steps (5) and (6) or between steps (6) and (7), if desired. After step (8), an optional step (11) of stretching a multi-layer, microporous membrane, an optional heat treatment step (12), an optional cross-linking step with ionizing radiations (13), and an optional hydrophilic treatment step (14), etc., can be conducted.

The main difference between the third production method and the second production method is in the order of the steps for laminating and cooling.

In the second production method, laminating the first and second polyolefin solutions is conducted before the cooling step. In the third production method, the first and second polyolefin solutions are cooled before the laminating step.

The steps of (1), (2), (7) and (8) in the third production method can be the same as the steps of (1), (2), (5) and (6) in the first production method as described above. For the extrusion of the first polyolefin solution through the first die, the conditions of step (3) of the second production method can be used for step (3) of the third production method. For the extrusion of the second solution through the second die, the conditions of step (4) in the third production method can be the same as the conditions of step (3) in the second production method. In one embodiment, either the first or second polyolefin solution is extruded through a third die. In this way, a multi-layer laminate can be formed having two layers produced from the first polyolefin solution and a single layer produced from the second polyolefin solution, or vice versa.

Step (5) of the third production method can be the same as step (4) in the first production method except that in the third production method the first and second gel-like sheets are formed separately.

The step (6) of laminating the first and second gel-like sheets can be conducted Process under the same conditions as those disclosed in connection with the third production method of PCT Publication No. WO 2008/016174, for example.

D. Fourth Production Method

The fourth method for producing the multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding the first polyolefin solution through at least one first die to form at least one first extrudate, (4) extruding the second polyolefin solution through at least one second die to form at least one second extrudate, (5) cooling first and second extrudates to form at least one first gel-like sheet and at least one second gel-like sheet, (6) removing at least a portion of the first and second membrane-forming solvents from the first and second gel-like sheets to form solvent-removed first and second gel-like sheets, (7) drying the solvent-removed first and second gel-like sheets to form at least one first polyolefin membrane and at least one second polyolefin membrane, and (8) laminating the first and second microporous polyolefin membranes in order to form the multi-layer, microporous polyolefin membrane.

A stretching step (9), a hot solvent treatment step (10), etc., can be conducted between steps (5) and (6), if desired. A stretching step (11), a heat treatment step (12), etc., can be conducted between steps (7) and (8), if desired. After step (8), a step (13) of stretching a multi-layer, microporous membrane, a heat treatment step (14), a cross-linking step with ionizing radiations (15), a hydrophilic treatment step (16), etc., can be conducted if desired.

Steps (1) and (2) in the fourth production method can be conducted under the same conditions as steps of (1) and (2) in the first production method. Steps (3), (4), and (5) in the fourth production method can be conducted under the same conditions as steps (3), (4), and (5) in the third method. Step (6) in the fourth production method can be conducted under the same conditions as step (5) in the first production method except for removing the membrane-forming solvent from the first and second gel-like sheets. Step (7) in the fourth production method can be conducted under the same conditions as step (6) in the first production method except that in the fourth production method the first and second solvent-removed gel-like sheets are dried separately. Step (8) in the fourth production method can be conducted under the same conditions as the step (6) in the third production method except for laminating the first and second polyolefin microporous membranes. The stretching step (9) and the hot solvent treatment step (10) in the fourth production method can be conducted under the same conditions as step (9) and (10) in the third production method. The stretching step (11) and the heat treatment step (12) in the fourth production method can be conducted under the same conditions as steps (9) and (10) in the first production method except that in the fourth production method the first and second polyolefin microporous membranes are stretched and/or heat treated.

The stretching step (11) and heat treatment step (12) can be the same as those disclosed in connection with the fourth production method of PCT Publication No. WO 2008/016174, for example The conditions in step (13), stretching a multi-layer, microporous membrane, a heat treatment step (14), a cross-linking step with ionizing radiations (15), and a hydrophilic treatment step (16) in the fourth production method can be the same as those for steps (9), (10), (11) and (12) in the first production method.

[4] The Properties of a Multi-Layer, Microporous Polyolefin Membrane

In an embodiment, the membrane is a multilayer microporous membrane. The thickness of the membrane is generally in the range of from about 1 μm to about 200 μm, e.g., from about 5 μm to about 30 μm. The thickness of the microporous membrane can be measured by a contact thickness meter at 1 cm longitudinal intervals over the width of 20 cm, and then averaged to yield the membrane thickness. Thickness meters such as the Litematic available from Mitsutoyo Corporation are suitable. This method is also suitable for measuring thickness variation after heat compression, as described below. Non-contact thickness measurements are also suitable, e.g., optical thickness measurement methods.

Optionally, the microporous membrane has one or more of the following properties.

A. Porosity of about 25% to about 80%

In an embodiment, the membrane has a porosity ≥25%, e.g., in the range of about 25% to about 80%, or 30% to 60%. The membrane's porosity is measured conventionally by comparing the membrane's actual weight to the weight of an equivalent non-porous membrane of the same composition (equivalent in the sense of having the same length, width, and thickness). Porosity is then determined using the formula: Porosity %=100×(w2−w1)/w2, wherein "w1" is the actual weight of the microporous membrane and "w2" is the weight of the equivalent non-porous membrane having the same size and thickness.

B. Weight Per Unit Area of about 5 g/m$^2$ to 19 g/m$^2$ at 25-μm Thickness

In an embodiment, the membrane has a basic weight (weight per unit area) in the range of about 5 g/m$^2$ to 19 g/m$^2$ when normalized to a membrane thickness of 25-μm.

C. Normalized Air Permeability of about 20 Seconds/100 cm$^3$ to about 500 Seconds/100 cm$^3$ (Converted to Value at 25-μm Thickness)

In an embodiment, the membrane's Normalized Air Permeability (Gurley value, normalized to an equivalent membrane thickness of 25 µm) is ≤500 seconds/100 cm³/25 µm, e.g., ≤400 seconds/100 cm³/25 µm. For example, the membrane's Normalized Air Permeability can be in the range of about 20 seconds/100 cm³/25 µm to about 500 seconds/100 cm³/25 µm, such as about 100 seconds/100 cm³/25 µm to about 400 seconds/100 cm³/25 µm. Since the air permeability value is normalized to a film thickness of 25 µm, Normalized air permeability is measured according to JIS P8117, and the results are normalized to a value at a thickness of 25 µm using the equation $A=25\ \mu m*(X)/T_1$, where X is the measured air permeability of a membrane having an actual thickness $T_1$ and A is the Normalized Air Permeability at a thickness of 25 µm.

In an embodiment, the membrane has a Normalized Air Permeability satisfying the relationship $A \leq (M*P)-I$ where A is the microporous membrane's Normalized Air Permeability and P is the microporous membrane's Normalized Pin Puncture Strength expressed in units of mN and normalized to a 25 µm membrane thickness. M is a slope (using the axes and units of FIG. 4) in the range of about 0.09 to about 0.1, or about 0.95 to about 0.99. In an embodiment, M is equal to 0.097. The term "I" is an intercept on the Y axis (using the axes and units of FIG. 4) that is ≥100, e.g., ≥110, such as ≥150, or ≥200, or ≥250; or, e.g., in the range of about 100 to about 250, or from about 110 to about 240.

Figure 4:
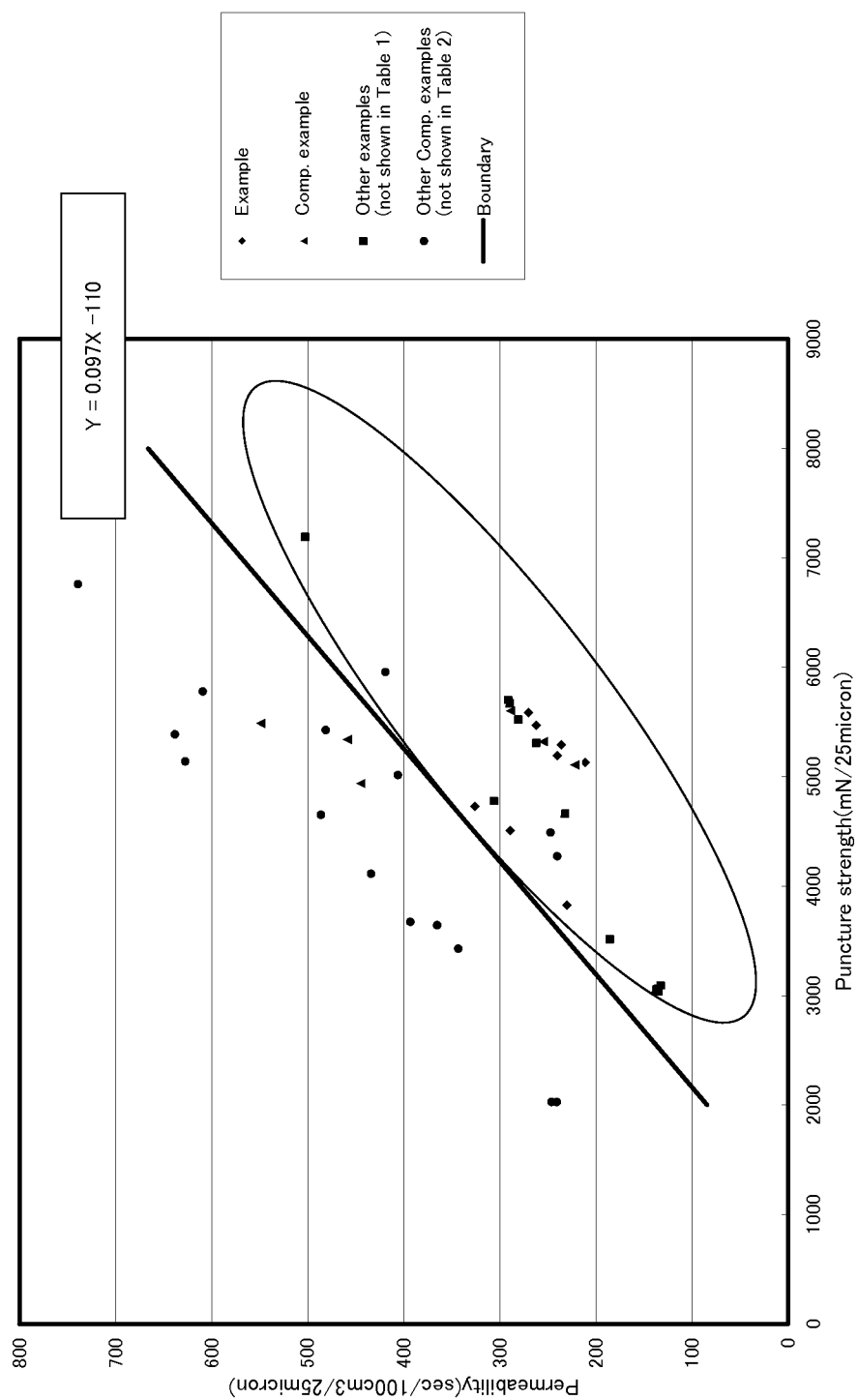
FIG. 4 is a graph showing Air permeability (Y axis) and Pin Puncture Strength (X axis) for various microporous membranes. The membranes described in the Examples are represented by diamonds and the membranes described in the Comparative Examples are represented by triangles. Membranes of the invention but not further exemplified are represented by rectangles. Points represented by circles are membranes which have (i) a Rupture temperature lower (cooler) than 180° C. and/or (ii) an Air Permeability that is greater than 0.097P+I, where I is in the range of about 100 to about 250. I represents the Y intercept of the line plotted on FIG. 4, which has a slope of about 0.097. Air Permeability is expressed in the units of sec/100 cm$^3$/25 μm and P is the microporous membrane's Pin Puncture Strength expressed in the units of mN/25 μm (where "/25 μm" means normalized to the value for a membrane of 25 μm thickness).

In another embodiment, the membrane has an Air Permeability and Pin Puncture Strength that fail on or within the boundary of the ellipse shown in FIG. 4. In yet another embodiment, the membrane has an Air Permeability satisfying the relationship $(M_2*P)-I_2 \leq A \leq (M_1*P)-I_1$.

$M_1$ and $M_2$ are independently selected and can each be, e.g., in the range of about 0.09 to about 0.1, or about 0.95 to about 0.99. In an embodiment, $M_1$ and $M_2$ are equal. For example, $M_1$ and $M_2$ can be 0.097. $I_1$ can be, e.g., in the range of about 100 to about 240, or from about 110 to about 230. In an embodiment, $I_1$ is 110. $I_2$ can be, e.g., ≥260. For example, $I_2$ can be in the range of about 260 to about 450. Units and axes are the same as in FIG. 4.

D. Normalized Pin Puncture Strength of about 3,000 mN/25 µm or More

In an embodiment, the membrane has a Normalized Pin Puncture strength ≥3000 mN/25 µm, e.g., in the range of 3,300 mN/25 µm to 10,000 mN/20 µm, such as 3,400 mN/25 µm to 5,500 mN/25 µm. Pin puncture strength is defined as the maximum load measured when a microporous membrane having a thickness of $T_1$ is pricked with a needle of 1 mm in diameter with a spherical end surface (radius R of curvature: 0.5 mm) at a speed of 2 mm/second. The pin puncture strength ("S") is normalized to a value at a membrane thickness of 25 µm using the equation $S_2=25\ \mu m*(S_1)/T_1$, where $S_1$ is the measured pin puncture strength, $S_2$ is the normalized pin puncture strength, and $T_1$ is the average thickness of the membrane in µm.

E. Heat Shrinkage Ratio at 105° C. of Less than 3% in at Least One Planar Direction.

In an embodiment, the heat shrinkage ratio measured at 105° C. in at least one planar direction is <3%, e.g., ≤2%, such as ≤1%, or ≤0.7%. In another embodiment, the heat shrinkage ratio in the membrane's TD is <3%, e.g., ≤2%, such as ≤1%, or ≤0.7% or less; for example in the range of 0.5% to 2.5%. In yet another embodiment the membrane's MD heat shrinkage ratio ≤2.6% and the membrane's TD heat shrinkage ratio is ≤1.0, or ≤0.7.

The membrane's heat shrinkage in orthogonal planar directions (e.g., MD or TD) at 105° C. is measured as follows:

(i) Measure the size of a test piece of microporous membrane at ambient temperature in both MD and TD, (ii) expose the test piece to a temperature of 105° C. for 8 hours with no applied load, and then (iii) measure the size of the membrane in both MD and TD. The heat (or "thermal") shrinkage in either the MD or TD can be obtained by dividing the result of measurement (i) by the result of measurement (ii) and expressing the resulting quotient as a percent.

F. Shutdown Temperature of about 140° C. or Lower

In an embodiment, the membrane's shutdown temperature is 140° C. or lower, e.g., in the range of about 120° C. to about 140° C., or alternatively, in the range of about 130° C. to about 134° C.

The shut down temperature of the microporous membrane is measured by a thermomechanical analyzer (TMA/SS6000 available from Seiko Instruments, Inc.) as follows: A rectangular sample of 3 mm×50 mm is cut out of the microporous membrane such that the long axis of the sample is aligned with the transverse direction of the microporous membrane and the short axis is aligned with the machine direction. The sample is set in the thermomechanical analyzer at a chuck distance of 10 mm, i.e., the distance from the upper chuck to the lower chuck is 10 mm. The lower chuck is fixed and a load of 19.6 mN applied to the sample at the upper chuck. The chucks and sample are enclosed in a tube which can be heated. Starting at 30° C., the temperature inside the tube is elevated at a rate of 5° C./minute, and sample length change under the 19.6 mN load is measured at intervals of 0.5 second and recorded as temperature is increased. The temperature is increased to 200° C. "Shut down temperature" is defined as the temperature of the inflection point observed at approximately the melting point of the polymer having the lowest melting point among the polymers used to produce the membrane.

G. Rupture Temperature of at Least about 180° C.

Figure 5:
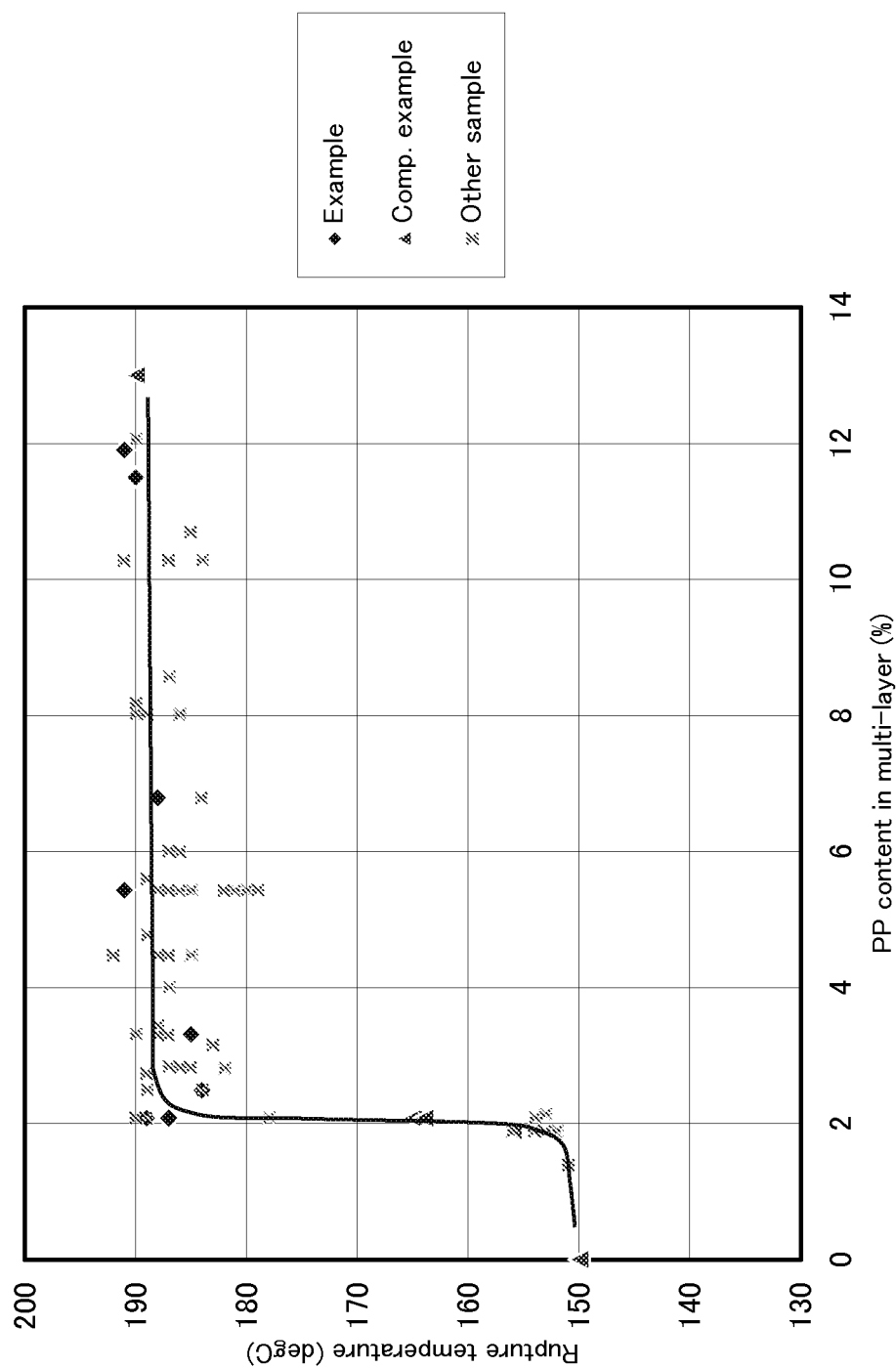
FIG. 5 is a graph showing the Rupture temperature of microporous polymeric membranes as a function of the membrane's total polypropylene content, e.g., the total amount as measured by wt. % of first and second polypropylene in the membrane, based on the total weight of the membrane. The membranes described in the Examples are represented by diamonds and the membranes described in the Comparative Examples are represented by triangles. Membranes not further exemplified are represented by asterisks.

The microporous membrane should have a rupture temperature of about 180° C. or higher, or about 185° C. or higher, or about 190° C. or higher. In an embodiment, the rupture temperature is in the range of about 180° C. to about 195° C., or about 185° C. to about 190° C. FIG. 5 shows that when the total amount polypropylene in the membrane is 2 wt. % or higher, based on the total weight of the membrane, the membrane's Rupture temperature 180° C. or higher. In an embodiment, the total amount polypropylene in the membrane having (a) an Mw of 600,000 or higher,
(b) an Mw/Mn in the range of 3 to 10, and
(c) a ΔHm of 90 J/g or higher is 2 wt. % or higher, or 2.05 wt. % or higher, or 2.1 wt. % or higher, based on the total weight of the membrane.

Rupture temperature is measured as follows. A microporous membrane of 5 cm×5 cm is sandwiched by blocks each having a circular opening of 12 mm in diameter, and a tungsten carbide ball of 10 mm in diameter was placed on the microporous membrane in the circular opening. While heating at a temperature-elevating speed of 5° C./minute, the temperature at which the microporous polyolefin membrane is ruptured by melting is measured and recorded as the rupture temperature.

H. Maximum Shrinkage in Molten State of 30% or Less

The multi-layer microporous membrane should exhibit a maximum shrinkage in the molten state (about 140° C.) of about 30% or less, e.g., about 20% or less.

Maximum shrinkage in the molten state in a planar direction of the membrane is measured by the following procedure:

Using the TMA procedure described for the measurement of melt down temperature, the sample length measured in the temperature range of from 135° C. to 145° C. are recorded. The membrane shrinks, and the distance between the chucks decreases as the membrane shrinks. The maximum shrinkage in the molten state is defined as the sample length between the chucks measured at 23° C. (L1 equal to 10 mm) minus the minimum length measured generally in the range of about 135° C. to about 145° C. (equal to L2) divided by L1, i.e., [L1−L2]/L1*100%. When TD maximum shrinkage is measured, the rectangular sample of 3 mm×50 mm used is cut out of the microporous membrane such that the long axis of the sample is aligned with the transverse direction of the microporous membrane as it is produced in the process and the short axis is aligned with the machine direction. When MD maximum shrinkage is measured, the rectangular sample of 3 mm×50 mm used is cut out of the microporous membrane such that the long axis of the sample is aligned with the machine direction of the microporous membrane as it is produced in the process and the short axis is aligned with the transverse direction.

In one embodiment, the membrane's maximum in the molten state is in the TD direction, and is ≤20%, e.g., in the range of from about 1% to about 18%, such as 1% to 10%.

[5] Battery Separator

In an embodiment, the multi-layer, microporous membrane is used as a battery separator. The membrane generally has a thickness in the range of about 3 μm to about 200 μm, or about 5 μm to about 50 μm. Depending, e.g., on the choice of electrolyte, separator swelling might increase the final thickness to a value larger than 200 μm.

[6] Battery

The microporous membranes of the invention are useful as battery separators in e.g., lithium ion primary and secondary batteries. Such batteries are described in PCT publication WO 2008/016174 which is incorporated by reference herein in its entirety.

Figure 2:
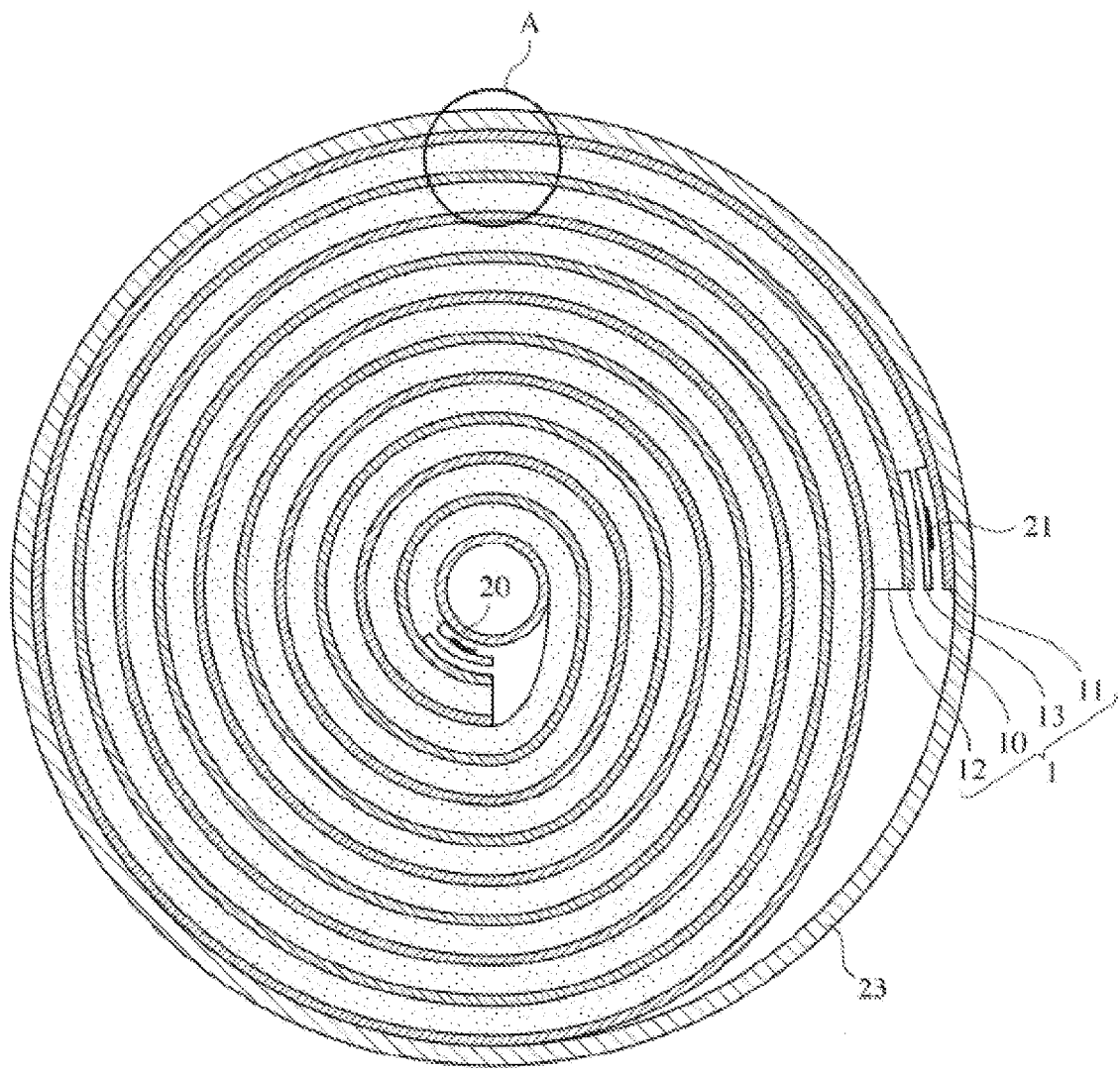
FIG. 2 is a cross-sectioned view showing the battery in FIG. 1.

FIG. 1 shows an example of a cylindrical-type lithium ion secondary battery comprising two battery separators, at least one of which has a heat shrinkage ratio measured at 105° C. in at least one planar direction of the membrane of less than 3% and a rupture temperature of 180° C. or higher. The battery has a toroidal-type electrode assembly 1 comprising a first separator 10, a second separator 11, a cathode sheet 13, and an anode sheet 12. The separators' thicknesses are not to scale, and are greatly magnified for the purpose of illustration. The toroidal-type electrode assembly 1 can be wound, e.g., such that the second separator 11 is arranged on an outer side of the cathode sheet 13, while the first separator 10 is arranged on the inner side of the cathode sheet. In this example, the second separator 11 is arranged on inside surface of the toroidal-type electrode assembly 1, as shown in FIG. 2.

Figure 3:
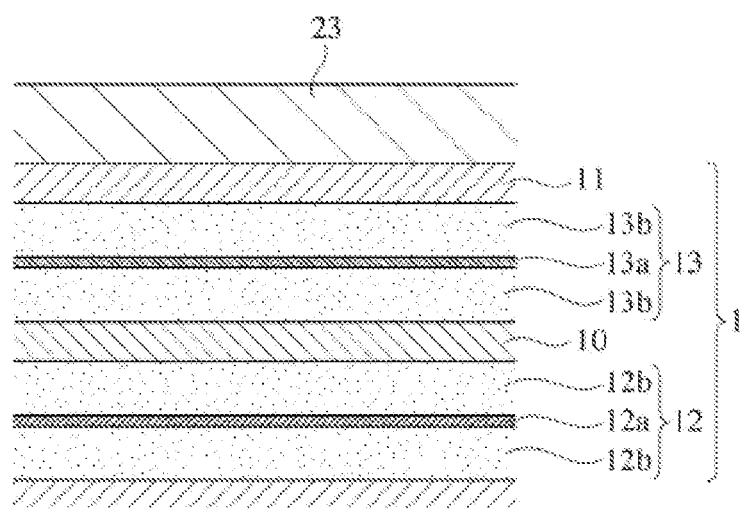
FIG. 3 is an enlarged cross-sectioned view showing a portion A in FIG. 2.

In this example, an anodic active material layer 12b is formed on both sides of the current collector 12a, and a cathodic active material layer 13b is formed on both sides of the current collector 13a, as shown in FIG. 3. As shown in FIG. 2, an anode lead 20 is attached to an end portion of the anode sheet 12, and a cathode lead 21 is attached to an end portion of the cathode sheet 13. The anode lead 20 is connected with battery lid 27, and the cathode lead 21 is connected with the battery can 23.

While a battery of cylindrical form is illustrated, the invention is not limited thereto, and the separators of the invention are suitable for use in e.g., prismatic batteries such as those containing electrodes in the form of stacked plates of anode(s) 12 and a cathode (3) 13 alternately connected in parallel with the separators situated between the stacked anodes and cathodes.

When the battery is assembled, the anode sheet 12, the cathode sheet 13, and the first and second separators 10, 11 are impregnated with the electrolytic solution, so that the separator 10, 11 (microporous membranes) are provided with ion permeability. The impregnation treatment is can be conducted, e.g., by immersing electrode assembly 1 in the electrolytic solution at room temperature. A cylindrical type lithium ion secondary battery can be produced by inserting the toroidal-type electrode assembly 1 (see FIG. 1) into a battery can 23 having a insulation plate 22 at the bottom, injecting the electrolytic solution into the battery can 23, covering the electrode assembly 1 with a insulation plate 22, caulking a battery lid (24, 25, 26, and 27) to the battery can 23 via a gasket 28. The battery lid functions as an anode terminal.

FIG. 3 (oriented so that the battery lid, i.e., the anode terminal of FIG. 1, is toward the right) illustrates the advantage of using a separator having diminished tendency to shrinkage in the transverse direction (with respect to the separator manufacturing process) as the battery temperature increases. One role of the separator is to prevent contact of the anodic active material layer and the cathodic active material layer. In the event of a significant amount of heat-shrinkage, the thin edges of the separators 10 and 11 move away from the battery lid (move leftward in FIG. 3), thereby allowing contact between the anodic active material layer and the cathodic active material layer, resulting in a short circuit. Since the separators can be quite thin, usually less than 200 μm, the anodic active material layer and the cathodic active material layer can be quite close. Consequently, even a small decrease in the amount of separator shrinkage at elevated battery temperature can make a significant improvement in the battery's resistance to internal short circuiting.

The battery is useful as a source or sink of power from one or more electrical or electronic components, Such components include passive components such as resistors, capacitors, inductors, including, e.g., transformers; electromotive devices such as electric motors and electric generators, and electronic devices such as diodes, transistors, and integrated circuits. The components can be connected to the battery in series and/or parallel electrical circuits to form a battery system. The circuits can be connected to the battery directly or indirectly. For example, electricity flowing from the battery can be converted electrochemically (e.g., by a second battery or fuel cell) and/or electromechanically (e.g., by an electric motor operating an electric generator) before the electricity is dissipated or stored in a one or more of the components. The battery system can be used as a power source for moving an electric vehicle or hybrid electric vehicle, for example. In one embodiment, the battery is electrically connected to an electric motor and/or an electric generator for powering an electric vehicle or hybrid electric vehicle.

[7] Examples

The present invention will be explained in more detail referring to the following non-limiting examples.

Example 1

(1) Preparation of First Polyolefin Solution

A first polyolefin composition comprising (a) 82% of PE1 having an Mw of $5.6 \times 10^5$ and an Mw/Mn of 4.05, (b) 18% of PE2 having an Mw of $1.9 \times 10^6$ and an Mw/Mn of 5.09, is prepared by dry-blending. The polyethylene resin in the composition has a melting point of 135° C. and a crystal dispersion temperature of 100° C.

Twenty-five parts by weight of the resultant first polyolefin composition is charged into a strong-blending double-screw extruder having an inner diameter of 58 mm and L/D of 42, and 65 parts by mass of liquid paraffin (50 cst at 40° C.) is supplied to the double-screw extruder via a side feeder. Melt-blending is conducted at 210° C. and 200 rpm to prepare a first polyolefin solution.

(2) Preparation of Second Polyolefin Solution

A second polyolefin solution is prepared in the same manner as above except as follows. A second polyolefin composition comprising (a) 63.7% of PE1 having an Mw of $5.6 \times 10^5$ and an Mw/Mn of 4.05, and (b) 1.3% of PE2 having of $1.9 \times 10^6$ and an Mw/Mn of 5.09, and (c) 35% of second polypropylene resin having an Mw of $1.6 \times 10^6$, an Mw/Mn of 5.2 and a $\Delta Hm$ of 114.0 J/g, by weight of the second polyolefin composition, is prepared by dry-blending. The polyethylene resin in the composition has a melting point of 135° C. and a crystal dispersion temperature of 100° C. Thirty parts by weight of the resultant second polyolefin composition is charged into a strong-blending double-screw extruder having an inner diameter of 58 mm and L/D of 42, and 70 parts by mass of liquid paraffin (50 cst at 40° C.) is supplied to the double-screw extruder via a side feeder. Melt-blending is conducted at 210° C. and 200 rpm to prepare a second polyolefin solution.

(3) Production of Membrane

The first and second polyolefin solutions are supplied from their respective double-screw extruders to a three-layer-extruding T-die, and extruded therefrom to form an extrudate (also called a laminate) of first polyolefin solution layer/second polyolefin solution layer/first polyolefin solution layer at a layer thickness ratio of 46.45/7.1/46.45. The extrudate is cooled while passing through cooling rollers controlled at 20° C., to form a three-layer gel-like sheet, which is simultaneously biaxially stretched at 119.3° C. to a magnification of 5 fold in both machine (longitudinal) and transverse directions by a tenter-stretching machine. The stretched three-layer gel-like sheet is fixed to an aluminum frame of 20 cm×20 cm, immersed in a bath of methylene chloride controlled at 25° C. to remove liquid paraffin with vibration of 100 rpm for 3 minutes, and dried by air flow at room temperature. The dried membrane is re-stretched by a batch-stretching machine to a magnification of 1.5 fold in the transverse direction (TD) while exposed to a temperature of 127.3° C., and then relaxed (tenter clips re-adjusted to a narrower width) to a TD magnification of 1.3 fold at the same temperature, the magnification factors being based on the width of the membrane (TD) before dry stretching before re-stretching. The re-stretched membrane, which remains fixed to the batch-stretching machine, is heat-set at 127.3° C. for 10 minutes to produce a three-layer microporous membrane.

Example 2

Example 1 is repeated except the amount of second polypropylene is reduced to 30%, the amount of PE2 in the second polyolefin is increased to 1.4% by mass, and the dried membrane is re-stretched to a TD magnification of 1.6 fold at 129° C. and relaxed to a TD magnification of 1.4 fold, the magnification factors being based on the width of the membrane (TD) before dry stretching before re-stretching at 129° C. The layer thickness ratio of 46.3/7.4/46.3

Example 3

Example 2 is repeated except the layer thickness ratio of first microporous membrane/second microporous membrane/first microporous membrane is 46.3/7.4/46.3.

Example 4

Example 2 is repeated except the layer thickness ratio of first microporous membrane/second microporous membrane/first microporous membrane is 46.45/7.1/46.4.

Comparative Example 1

Example 1 is repeated except there is no second polyolefin solution; and except that the amount of PE1 was decreased, the amount of PE2 was increased, the stretching temperature for the gel like sheet is decreased, and no re-stretching is used. In other words, the membrane is a monolayer membrane produced from the first polyolefin solution. This comparative example also differs from Example 1 in that the dried membrane is not re-stretched.

Comparative Example 2

Example 2 is repeated except there is no first polyolefin solution; and except that the stretching temperature for the gel like sheet is decreased, the temperature during re-stretching is decreased, and the heat set temperature is decreased. In other words, the membrane is a monolayer membrane produced from the second polyolefin solution.

Comparative Example 3

Example 2 is repeated except the layer thickness ratio of first microporous membrane/second microporous membrane/first microporous membrane is 47/6/47; and except that the relative amounts of the second polyolefin is changed slightly, the stretching temperature for the gel like sheet is decreased, the temperature during re-stretching is decreased, and the heat set temperature is decreased.

Comparative Example 4

Comparative Example 3 is repeated except the first polyolefin content in the first polyolefin solution is increased to 35% and the second polypropylene resin in the second polyolefin composition has an Mw of $1.56 \times 10^6$, an Mw/Mn of 3.2 and a $\Delta Hm$ of 78.40 J/g.

Comparative Example 5

Comparative Example 3 is repeated except the second polyolefin content in the second polyolefin solution is 35% and the second polypropylene resin in the second polyolefin composition has an Mw of $2.67 \times 10^6$, an Mw/Mn of 2.6 and a $\Delta Hm$ of 99.4, and the amount of polypropylene is increased to 50%.

Properties

The properties of the multi-layer microporous membranes of Examples 1-4 and Comparative Examples 1-5 are shown in Tables 1 and 2.

TABLE 1

| | | Example 1 | Example 2 | Example 3 | Example 4 |
|---|---|---|---|---|---|
| Resin composition | | | | | |
| First Polyolefin | | | | | |
| PE1 | Mw | $3.0 \times 10^5$ | $3.0 \times 10^5$ | $3.0 \times 10^5$ | $3.0 \times 10^5$ |
| | Mw/Mn | 8.6 | 8.6 | 8.6 | 8.6 |
| | % by mass | 82 | 82 | 82 | 82 |
| PE2 | Mw | $2.0 \times 10^6$ | $2.0 \times 10^6$ | $2.0 \times 10^6$ | $2.0 \times 10^6$ |
| | Mw/Mn | 8 | 8 | 8 | 8 |
| | % by mass | 18 | 18 | 18 | 18 |
| 1st PP | Mw | — | — | — | — |
| | Mw/Mn | — | — | — | — |
| | Heat of fusion(J/g) | — | — | — | — |
| | % by mass | — | — | — | — |
| Conc. of PO Comp. % by mass | | 25 | 25 | 25 | 25 |
| Second Polyolefin | | | | | |
| PE1 | Mw | $3.0 \times 10^5$ | $3.0 \times 10^5$ | $3.0 \times 10^5$ | $3.0 \times 10^5$ |
| | Mw/Mn | 8.6 | 8.6 | 8.6 | 8.6 |
| | % by mass | 63.7 | 68.6 | 68.6 | 68.6 |
| PE2 | Mw | $2.0 \times 10^6$ | $2.0 \times 10^6$ | $2.0 \times 10^6$ | $2.0 \times 10^6$ |
| | Mw/Mn | 8 | 8 | 8 | 8 |
| | % by mass | 1.3 | 1.4 | 1.4 | 1.4 |
| 2nd PP | Mw | $1.10 \times 10^6$ | $1.10 \times 10^6$ | $1.10 \times 10^6$ | $1.10 \times 10^6$ |
| | Mw/Mn | 5.0 | 5.0 | 5.0 | 5.0 |
| | Heat of fusion(J/g) | 114 | 114 | 114 | 114 |
| | % by mass | 35 | 30 | 30 | 30 |
| Conc. of PO Comp. % by mass | | 30 | 30 | 30 | 30 |
| Production condition | | | | | |
| Extrudate | | | | | |
| Layer structure | | (I)/(II)/(I) | (I)/(II)/(I) | (I)/(II)/(I) | (I)/(II)/(I) |
| Layer thickness ratio | | 46.45/7.1/46.45 | 46.3/7.4/46.3 | 46.3/7.4/46.3 | 46.45/7.1/46.45 |
| Total PP content % by mass | | 2.94 | 2.63 | 2.63 | 2.52 |
| Stretching of Gel-Like sheet | | | | | |
| Temperature (° C.) | | 119.3 | 117 | 117 | 117 |
| Magnification (MD × TD) | | 5 × 5 | 5 × 5 | 5 × 5 | 5 × 5 |
| Stretching of dried membrane | | | | | |
| Temperature (° C.) | | 127.3 | 129 | 129 | 129 |
| Magnification (TD) | | 1.5 | 1.6 | 1.6 | 1.6 |
| Relaxation of re-stretched membrane | | | | | |
| Temperature (° C.) | | 127.3 | 129 | 129 | 129 |
| Final magnification (TD) | | 1.3 | 1.4 | 1.4 | 1.4 |
| Heat setting treatment | | | | | |
| Temperature (° C.) | | 127.3 | 129 | 129 | 129 |
| Time (min) | | 10 | 10 | 10 | 10 |
| Properties | | | | | |
| Average thickness (μm) | | 20.0 | 20.0 | 20.0 | 20.1 |
| Normalized Air Permeability (sec/100 cm³/25 μm) | | 212 | 350 | 347 | 362 |
| Porosity % | | 43.0 | 41.0 | 41.0 | 41.0 |
| Weight per unit area | | 14.1 | 14.5 | 14.5 | 14.5 |
| Normalized Puncture Strength (mN/25 μm) | | 3430 | 5022 | 5000 | 5242 |
| Heat shrinkage MD/TD (%) | | 3.5/1.5 | 3.0/1.0 | 2.6/1.0 | 2.6/0.7 |
| Shut Down Temp. ° C. | | 133 | 132 | 132 | 132 |
| Rupture Temp. ° C. | | 187 | 183 | 183 | 184 |
| Maximum shrinkage (TMA) % | | 3 | 18 | 18 | 18 |
| Is A ≤ 0.097P-110 ? | | Yes | Yes | Yes | Yes |
| (A ≤ 0.097P-I) | | 222 | 377 | 375 | 398 |

TABLE 2

| | Comp. Ex 1 | Comp. Ex 2 | Comp. Ex 3 | Comp. Ex 4 | Comp. Ex 5 |
|---|---|---|---|---|---|
| First Polyolefin | | | | | |
| PE1 Mw | $3.0 \times 10^5$ | — | $3.0 \times 10^5$ | $3.0 \times 10^5$ | $3.0 \times 10^5$ |
| Mw/Mn | 8.6 | — | 8.6 | 8.6 | 8.6 |
| % by mass | 80 | — | 80 | 80 | 80 |
| PE2 Mw | $2.0 \times 10^6$ | — | $2.0 \times 10^6$ | $2.0 \times 10^6$ | $2.0 \times 10^6$ |
| Mw/Mn | 8 | — | 8 | 8 | 8 |
| % by mass | 20 | — | 20 | 20 | 20 |
| $1^{st}$ PP Mw | — | — | — | — | — |
| Mw/Mn | — | — | — | — | — |
| Heat of fusion(J/g) | — | — | — | — | — |
| % by mass | — | — | — | — | — |
| Conc. of PO Comp. % by mass | 30 | — | 25 | 35 | 25 |
| Second Polyolefin | | | | | |
| PE1 Mw | — | $3.0 \times 10^5$ | $3.0 \times 10^5$ | $3.0 \times 10^5$ | $3.0 \times 10^5$ |
| Mw/Mn | — | 8.6 | 8.6 | 8.6 | 8.6 |
| % by mass | — | 69 | 69 | 69 | 49 |
| PE2 Mw | — | $2.0 \times 10^6$ | $2.0 \times 10^6$ | $2.0 \times 10^6$ | $2.0 \times 10^6$ |
| Mw/Mn | — | 8 | 8 | 8 | 8 |
| % by mass | — | 1 | 1 | 1 | 1 |
| $2^{nd}$ PP Mw | — | $1.10 \times 10^6$ | $1.10 \times 10^6$ | $1.56 \times 10^6$ | $2.67 \times 10^6$ |
| Mw/Mn | — | 5.0 | 5.0 | 3.2 | 2.6 |
| Heat of fusion(J/g) | — | 114.0 | 114.0 | 78.4 | 99.0 |
| % by mass | — | 30 | 30 | 30 | 50 |
| Conc. of PO Comp. % by mass | — | 30 | 30 | 30 | 35 |
| Extrudate | | | | | |
| Layer structure | (I) | (II) | (I)/(II)/(I) | (I)/(II)/(I) | (I)/(II)/(I) |
| Layer thickness ratio | 100 | 100 | 47/6/47 | 46/8/46 | 40/20/40 |
| Total PP content % by mass | 0 | 30 | 1.89 | 2.08 | 13.0 |
| Stretching of Gel-Like sheet | | | | | |
| Temperature (° C.) | 115 | 115 | 115 | 115 | 115 |
| Magnification (MD × TD) | 5 × 5 | 5 × 5 | 5 × 5 | 5 × 5 | 5 × 5 |
| Stretching of dried membrane | | | | | |
| Temperature (° C.) | — | 127 | 127 | 127 | 127 |
| Magnification (TD) Initial value→relaxed value | — | 1.6→1.4 | 1.6→1.4 | 1.6→1.4 | 1.6→1.4 |
| Heat setting treatment | | | | | |
| Temperature (° C.) | 127 | 127 | 127 | 127 | 127 |
| Time (min) | 10 | 10 | 10 | 10 | 10 |
| Average thickness (μm) | 25.5 | 24.9 | 25.1 | 25.1 | 24.6 |
| Normalized Air Permeability (sec/100 cm³/25 μm) | 550 | 446 | 256 | 290 | 460 |
| Porosity % | 38.4 | 46.1 | 47.0 | 46.7 | 42.6 |
| Weight per unit area | 15.6 | 13.3 | 13.2 | 13.2 | 14.0 |
| Normalized Puncture Strength (mN/25 μm) | 5488 | 4939 | 5322 | 5603 | 5341 |
| Heat shrinkage MD/TD (%) | 5.5/5.0 | 4.3/1.8 | 3.4/1.4 | 3.6/1.5 | 4.2/2.1 |
| Shut Down Temp. ° C. | 132 | 136 | 132 | 132 | 132 |
| Rupture Temp. ° C. | 150 | 181 | 156 | 164 | 190 |
| Maximum shrinkage (TMA) % | 32 | 13 | 15 | 18 | 21 |
| Is A ≤ 0.097P−110? | no | no | yes | yes | no |

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

What is claimed is:

1. A multi-layer microporous membrane having a heat shrinkage ratio measured at 105° C. in the transverse direction of 1.0% or less and a rupture temperature of 180° C. or higher; wherein 1) the membrane comprises first and third microporous layers comprising polyethylene and a second microporous layer comprising polypropylene and polyethylene, the total amount of polypropylene being 2 to 10 wt. % based on the total weight of the membrane, the second microporous layer being located between the first and third microporous layers and the polypropylene having an Mw≥1.1×10$^6$ and a ΔHm≥90 J/g or more, 2) the membrane has a Normalized Air Permeability ≤400 seconds/100 cm$^3$/25 μm and satisfies A≤0.097P−I where A is the microporous membrane's Normalized Air Permeability, P is the membrane's Normalized Pin Puncture Strength, and I is 110, and 3) the second microporous layer has a thickness of 4.6% to 50% of the total thickness of the membrane.

2. The microporous membrane of claim 1, wherein the transverse direction heat shrinkage ratio is 0.7% or less.

3. The microporous membrane of claim 1, wherein (a) the first and third microporous layers each contain polyethylene in an amount in the range of from 80 wt. % to 100 wt. % based on the weight of the first microporous layer, (b) the second microporous layer further comprises a second polyethylene.

4. The microporous membrane of claim 1, wherein the first and third microporous layers consists essentially of polyethylene, and wherein the microporous membrane contains no more than 0.01 wt. % of inorganic species, based on the weight of the membrane.

5. The microporous membrane of claim 1, wherein the first and third layers comprise outer layers of the membrane and wherein the second layer is in planar contact with both the first and third layers.

6. A battery comprising an anode, a cathode, an electrolyte, and the multi-layer microporous membrane of claim 1, wherein the microporous membrane of claim 1 separates at least the anode from the cathode.

7. The battery of claim 6, wherein the electrolyte contains lithium ions and the battery is a secondary battery.

8. The battery of claim 6, further comprising one or more resistive and/or reactive components electrically, electrochemically, and/or electromechanically connected to the battery to form a battery system, wherein the battery is a source or sink of power to the component(s).

9. The battery system of claim 8, wherein at least one component comprises means for moving an electric vehicle or hybrid electric vehicle.

10. The battery system of claim 8, wherein the means comprise an electric motor and/or an electric motor, and the battery is electrically connected to the motor.

11. The multi-layer microporous membrane of claim 1, wherein the total amount of polypropylene is 2 to 5 wt. % based on the total weight of the membrane.

12. The multi-layer microporous membrane of claim 1, wherein the multi-layer microporous membrane comprises extrudate comprising a polyolefin and a diluent.

13. The multi-layer microporous membrane of claim 1, wherein a heat shrinkage ratio measured at 105° C. in a traverse direction is 2.0% or less.

14. The multi-layer microporous membrane of claim 1, wherein a maximum shrinkage in a molten state in a traverse direction is 20% or less.

15. A multi-layer microporous membrane having a heat shrinkage ratio measured at 105° C. in the transverse direction of 1.0% or less and a rupture temperature of 180° C. or higher; wherein 1) the membrane comprises first and third microporous layers comprising polyethylene and a second microporous layer comprising polypropylene and polyethylene, the total amount of polypropylene being 2 to 10 wt. % based on the total weight of the membrane, the second microporous layer being located between the first and third microporous layers and the polypropylene having an Mw≥1.1×10$^6$ and a ΔHm≥90 J/g or more, 2) the membrane has a Normalized Air Permeability ≤400 seconds/100 cm$^3$/25 μm and satisfies A≤0.097P−I where A is the microporous membrane's Normalized Air Permeability, P is the membrane's Normalized Pin Puncture Strength, and I is 110, 3) the second microporous layer has a thickness of 4.6% to 50% of the total thickness of the membrane; 4) a heat shrinkage ratio measured at 105° C. in a traverse direction is 2.0% or less; and 5) a maximum shrinkage in a molten state in a traverse direction is 20% or less.

* * * * *